(12) United States Patent
Bickley

(10) Patent No.: US 11,655,727 B1
(45) Date of Patent: May 23, 2023

(54) ROTARY SERVO FOR FIXED FAIL ACTUATORS

(71) Applicant: Rolls-Royce plc, London (GB)

(72) Inventor: Daniel J. Bickley, London (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 17/652,137

(22) Filed: Feb. 23, 2022

(51) Int. Cl.
| | | |
|---|---|---|
| F01B 25/02 | (2006.01) | |
| F01D 17/16 | (2006.01) | |
| F15B 13/04 | (2006.01) | |
| F15B 9/09 | (2006.01) | |
| F15B 20/00 | (2006.01) | |
| F15B 15/14 | (2006.01) | |

(52) U.S. Cl.
CPC ............... *F01D 17/16* (2013.01); *F15B 9/09* (2013.01); *F15B 13/0402* (2013.01); *F15B 15/149* (2013.01); *F15B 20/002* (2013.01); *F05D 2260/32* (2013.01); *F05D 2260/57* (2013.01)

(58) Field of Classification Search
CPC .. F15B 13/0402; F15B 13/0406; B64C 27/64; F02C 3/04
USPC ......................................................... 415/160
See application file for complete search history.

(56) References Cited

U.S. PATENT DOCUMENTS

| | | | |
|---|---|---|---|
| 10,450,061 B2 * | 10/2019 | Collins ................... | F15B 18/00 |
| 2008/0149181 A1 | 6/2008 | Kerckhove et al. | |
| 2016/0333901 A1 | 11/2016 | Dalton | |
| 2018/0100593 A1 * | 4/2018 | Smolka ................... | F04B 1/326 |
| 2018/0320715 A1 * | 11/2018 | Haugsjaahabink ....... | F15B 9/10 |
| 2022/0364658 A1 * | 11/2022 | Shelby .................. | F16K 31/406 |

FOREIGN PATENT DOCUMENTS

| | | |
|---|---|---|
| JP | S6069277 A | 4/1985 |
| WO | 2020208413 A1 | 10/2020 |

* cited by examiner

*Primary Examiner* — Long T Tran
*Assistant Examiner* — James J Kim
(74) *Attorney, Agent, or Firm* — Shumaker & Sieffert, P.A.

(57) ABSTRACT

In general, techniques are described regarding a rotary servo for actuators. A servo assembly includes a cylindrical outer sleeve including ports, a cylindrical outer spool annularly disposed within the cylindrical outer sleeve, a stepper motor mechanically coupled to the cylindrical outer spool, and an actuator mechanically coupled to compressor variable geometry that controls compression provided by a compressor. The cylindrical outer spool includes channels configured to provide fluidic interconnection between the ports and a cylindrical inner spool, where the cylindrical inner spool is annularly disposed within the cylindrical outer spool, and the cylindrical inner spool includes grooves configured to provide fluidic interconnection through the channels of the cylindrical outer sleeve. The stepper motor is configured to rotate the cylindrical outer spool within the cylindrical outer sleeve to deliver a fluid to and thereby actuate the actuator to control the compressor variable geometry.

20 Claims, 4 Drawing Sheets

ROTARY SERVO FOR FIXED FAIL ACTUATORS

TECHNICAL FIELD

The disclosure relates to gas turbine engines.

BACKGROUND

Gas turbine engines may include an axial compressor that provides compression (e.g., of air) prior to combustion. The axial compressor may include multiple compression stages, each stage including a row of rotating blades (referred to as a rotor) and a row of stationary blades (referred to as a stator). In each adjacent compressor stage, the rotors and stators become smaller to accommodate the increase in pressure across each stage and thereby maintain near constant axial velocity of the air.

To improve fuel efficiency and responsiveness of the compressor in achieving targeted levels of compression during variable conditions (e.g., accelerating, decelerating, etc.), the compressor may include variable geometry, such as in the form of variable stators. Actuators may control the variable geometry, where such actuators are controlled via an electrohydraulic servo assembly that operates with respect to a control signal and a fluid (such as fuel). The actuators may receive, via the electrohydraulic servo assembly, the fuel as a way by which to adjust linear movement of the actuator that then adjusts the position of the variable geometry.

The electrohydraulic servo assembly may include a rotary stepper motor that is electrically controlled via a control signal. The rotary stepper motor is further coupled via a mechanical mechanism (e.g., a rotary to linear translation mechanism coupled to a lever) that is mechanically coupled to a variable geometry feedback link that indicates mechanical movement of the variable geometry. This feedback link adjusts the delivery of the fuel (via the lever) and accompanying activation of the actuator to balance movement of the variable geometry with fuel delivery to the combustor to potentially achieve the improved fuel efficiency and responsiveness of the gas turbine engine.

SUMMARY

In one example, the disclosure is directed to a rotary actuation system of a gas turbine engine comprising: a servo assembly that includes: a cylindrical outer sleeve including multiple ports; a cylindrical outer spool annularly disposed within the cylindrical outer sleeve, wherein: the cylindrical outer spool includes multiple channels configured to provide fluidic interconnection between the multiple ports and a cylindrical inner spool, the cylindrical inner spool is annularly disposed within the cylindrical outer spool, and the cylindrical inner spool includes grooves configured to provide fluidic interconnection through the multiple channels of the cylindrical outer sleeve; and a stepper motor mechanically coupled to the cylindrical outer spool; and an actuator mechanically coupled to compressor variable geometry that controls compression provided by a compressor of the gas turbine engine, wherein the stepper motor is configured to rotate the cylindrical outer spool within the cylindrical outer sleeve to deliver a fluid to and thereby actuate the actuator to control the compressor variable geometry.

In another example, the disclosure is directed to a method comprising: receiving a control signal; and rotating, by a stepper motor of a servo assembly and based on the control signal, a cylindrical outer spool within a cylindrical outer sleeve in which the cylindrical outer spool is annularly displaced within to deliver a fluid to and thereby actuate an actuator to control compressor variable geometry of a gas turbine engine, wherein the cylindrical outer sleeve includes multiple ports, wherein the stepper motor is mechanically coupled to the cylindrical outer spool, wherein the cylindrical outer spool includes multiple channels configured to provide fluidic interconnection between the multiple ports and a cylindrical inner spool, wherein the cylindrical inner spool is annularly displaced within the cylindrical outer spool, the cylindrical inner spool including grooves configured to provide fluidic interconnection through the multiple channels of the cylindrical outer sleeve, and wherein the actuator is mechanically coupled to the compressor variable geometry.

In another example, the disclosure is directed to a gas turbine engine comprising: a combustor; a compressor fluidically upstream of the combustor that includes compressor variable geometry configured to control compression by the compressor; and a rotary actuation system mounted to a body of the gas turbine engine, the rotary actuation system including: a servo assembly that includes: a cylindrical outer sleeve including multiple ports; a stepper motor mechanically coupled to a cylindrical outer spool annularly displaced within the cylindrical outer sleeve; the cylindrical outer spool including multiple channels configured to provide fluidic interconnection between the multiple ports and a cylindrical inner spool; and the cylindrical inner spool annularly displaced within the cylindrical outer spool, the cylindrical inner spool including grooves configured to provide fluidic interconnection through the multiple channels of the cylindrical outer sleeve; and an actuator mechanically coupled to the compressor variable geometry, wherein the stepper motor is configured to rotate the cylindrical outer spool within the cylindrical sleeve to deliver a fluid to and thereby actuate the actuator to control the compressor variable geometry.

The details of one or more examples are set forth in the accompanying drawings and the description below. Other features, objects, and advantages of the disclosure will be apparent from the description and drawings, and from the claims.

DETAILED DESCRIPTION

Figure 1:
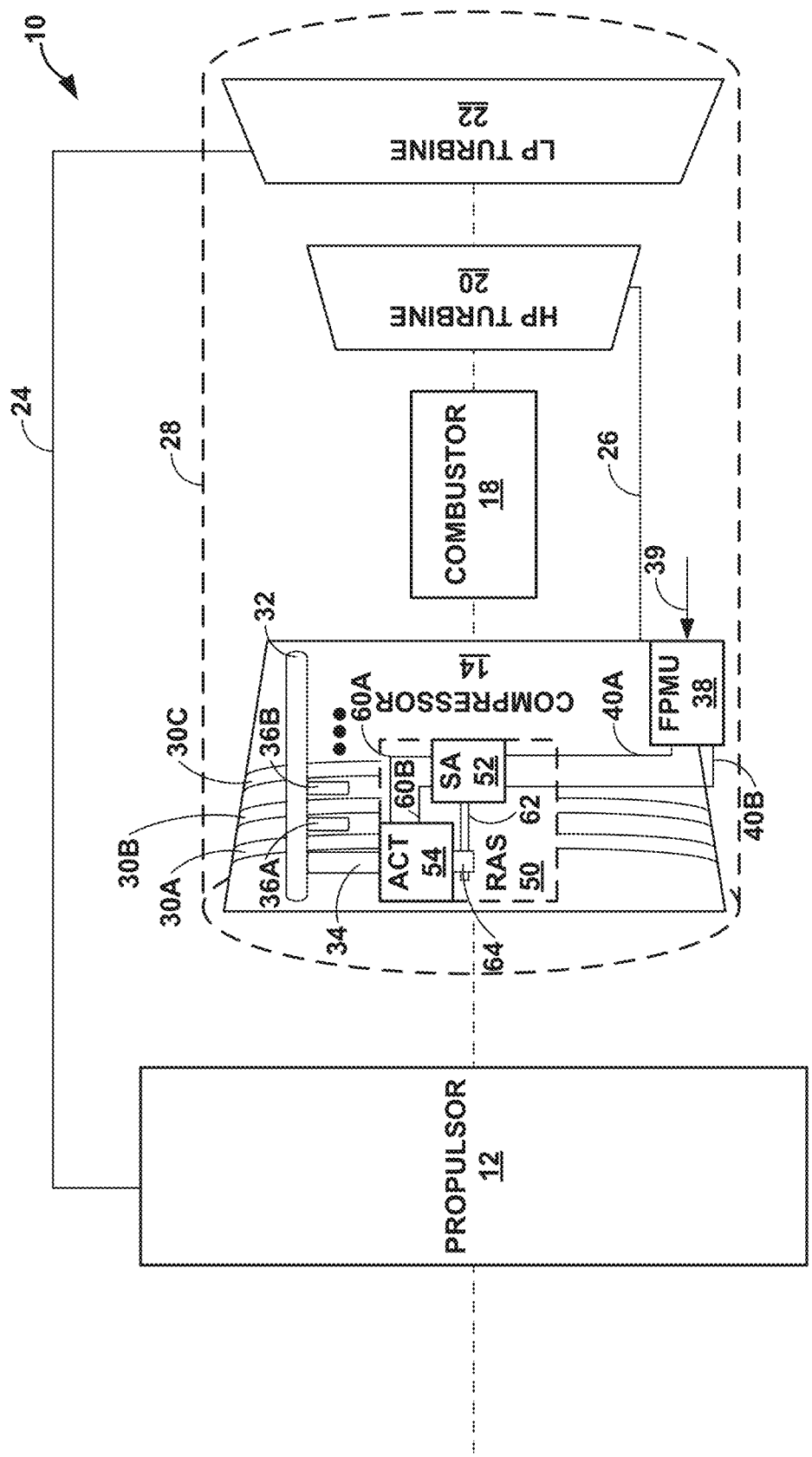
FIG. 1 is a conceptual diagram illustrating an example gas turbine engine that includes a rotatory actuator assembly for control of compressor variable geometry in accordance with various aspects of the techniques described in this disclosure.

The disclosure describes a gas turbine engine in which a compressor of the gas turbine engine includes a rotary actuator assembly. The rotary actuator assembly may operate rotationally in order to potentially avoid complicated mechanical mechanisms required to translate rotational motion of the stepper motor into linear operation for configuring the servo valve to deliver a fluid (e.g., fuel) to drive the linear motion of the actuator. The rotary actuator assembly may include a rotary servo valve in which a cylindrical outer spool annularly disposed within a cylindrical outer sleeve is mechanically coupled to the rotary stepper motor.

Responsive to receiving a control signal, the rotary stepper motor may rotate the cylindrical outer spool to deliver the fuel to the actuator and thereby actuate the actuator to deliver linear force to control the compressor variable geometry (e.g., stators). In this way, the rotary actuator assembly may reduce the complexity of the complicated mechanical mechanisms to translate rotational motion of the stepper motor into linear operation for configuring the servo valve to deliver the fuel to drive the linear motion of the actuator.

In addition, the actuator may be mounted on a body of the gas turbine engine via a rotary mount that enables the actuator to rotate when actuated. The rotation of the actuator may rotate a mechanical coupling to a cylindrical inner spool of the servo valve, where this cylindrical inner spool is annularly disposed within the cylindrical outer spool. The actuator may rotate about the mechanical coupling to the rotary stepper motor providing feedback representative of movement of the compressor variable geometry, turning the cylindrical inner spool to effectively disable actuation of the actuator (e.g., by stopping delivery of the fuel). In other words, the linear operation of the actuator when moving the variable geometry may result in rotation that provides feedback to the stepper motor via the mechanical coupling (e.g., a link coupled between the actuator and the rotary stepper motor).

This mechanical coupling, being directly coupled to the actuator (meaning there may be little to no intervening mechanical mechanisms to translate between rotational to linear movement), may further simplify the actuator assembly by removing the compressor variable geometry feedback link. Removal of the compressor variable geometry feedback link may allow for easier routing of lines (e.g., servo lines, fuel lines, etc.) and other components (e.g., fuel pumps, etc.) while still potentially achieving accurate feedback.

Removal of the servo translational mechanism and accompanying feedback link may result in more efficient maintenance. For example, the translational mechanism (between rotational and linear movement) may be prone to wear due to the varying stresses applied during operation of the gas turbine engine and the nature of competing forces from the rotary stepper motor and the competing feedback from the feedback link. Given the hydraulic nature of the rotary actuator assembly, this translational mechanism may reside within the fluid and thereby require disassembly of a fluid tight case. Removal of the translational mechanism may thereby allow for more straightforward maintenance, as the wear on the mechanical coupling of the rotary actuator assembly may occur outside of the hydraulic system used to activate the actuator while also reducing part counts that are subject to wear.

FIG. 1 is a conceptual diagram illustrating an example gas turbine engine that includes a rotatory actuator assembly for control of compressor variable geometry in accordance with various aspects of the techniques described in this disclosure. Gas turbine engine 10 is a primary propulsion engine that provides shaft horsepower for flight operations of a vehicle, such as an aircraft. In some examples, gas turbine engine 10 is a two-spool engine having a low pressure (LP) spool 24 and a high pressure (HP) spool 26. In other examples, gas turbine engine 10 may include a single spool or three or more spools, e.g., may include an intermediate pressure (IP) spool and/or other spools. In some examples, gas turbine engine 10 may include any suitable turbine powered-engine propulsion system, including but not limited to, a turboprop engine or a turboshaft engine (including rotary wing aircraft).

Gas turbine engine 10 includes a propulsor 12, a compressor 14, a combustor 18, a high pressure (HP) turbine 20, and a low pressure (LP) turbine 22, each of which is fluidically disposed in series with respect to one another as shown in the example of FIG. 1. That is, air enters compressor 14, which produces first stage compressed air that is directed into combustor 18.

Combustor 18 is fluidically disposed between compressor 14 and HP turbine 20, and as such is in series flow downstream from compressor 14. In some examples, combustor 18 includes a combustion liner (not shown) that encloses a continuous combustion process using the compressed air and fuel. In other examples, combustor 18 may take other forms, and may be, for example, a wave rotor combustion system, a rotary valve combustion system, a pulse detonation combustion system, or a slinger combustion system, and may employ deflagration and/or detonation combustion processes. Combustor 18 outputs the result of burning the fuel as hot expanding gases.

HP turbine 20 is fluidically disposed between combustor 18 and LP turbine 22, and as such is in series flow downstream of combustor 18. HP turbine 20 utilizes the hot expanding gases to drive HP spool 26, which in turn drives compressor 14. The hot expanding gases pass through HP turbine 20 to LP turbine 22, thereby driving LP spool 24. LP spool 24 is coupled to a gearbox, which provides mechanical energy to drive propulsor 12 (e.g., a propeller). Propulsor 12 provides thrust, lift, and/or rotational control for the aircraft (such as a helicopter—where such propellers may be referred to as a rotor—or propeller-driven airplanes, including rotary wing aircraft).

Compressor 14 includes one or more compressor stages. Each compressor stage may include a compressor stator vane row along the axial circumference of gas turbine engine 10 and a compressor rotor (which may refer to compressor blades attached along an axial circumference of a rotor disc), both of which are not shown for ease of illustration purposes in the example of FIG. 1. The compressor rotors for compressor 14 are spun between the compressor stator vane rows of compressor 14 via HP spool 26 to produce the compressed air. As shown in FIG. 1, compressor 14 may be fluidically upstream from combustor 18.

Each of HP turbine 20 and LP turbine 22 include one or more turbine stages. Each turbine sage may include a stator vane row along the axial circumference of gas turbine engine 10 and a turbine rotor (which may refer to turbine blades attached along an axial circumference of a rotor disc), both of which again are not shown in the example of FIG. 1 for ease of illustration purposes. The gas emitted by combustor 18 drives the turbine rotors of HP turbine 20 and LP turbine 22, which spin between the respective stator vane rows of HP turbine 20 and LP turbine 22. The rotation or spinning drives respective HP spool 26 and LP spool 24, which as noted above drive compressor 14 and propulsor 12.

Gas turbine engine 10 also includes a casing 28 (which may also be referred to as a "body 28") surrounding or otherwise forming portions of compressor 14, combustor 18, HP turbine 20, LP turbine 22 and possibly other components of gas turbine engine 10 that are not shown for ease of illustration in the example of FIG. 1. For example, the above noted compressor stator vane rows may be affixed to casing 28. Likewise, the turbine stator vane rows may be affixed to casing 28.

To maximize efficiency of gas turbine engine 10, the compression stator vanes in each row and the rotor blades are configured to produce a desired compression ratio of input air pressure to output air pressure. Similarly, to maximize efficiency of gas turbine engine 10, spacing between turbine stator vanes in each row and the blades of turbine rotors are configured so as to produce a desired ratio of mechanical energy to input energy (in terms of fuel expended).

In addition, the compression stator vanes may have a variable geometry in that the stator vanes may change pitch to potentially optimize the performance (in terms of the ratio of mechanical energy to input energy) of gas turbine engine 10 across the operating range. In the example of FIG. 1, the variable stator vanes are shown as bands 30A-30C ("bands 30," which may also be referred to as "variable geometry 30," "compressor variable geometry 30," "stator vanes 30," and/or "vanes 30"). As such, variable geometry 30 may control compression provided by compressor 14 of gas turbine engine 10. Although shown in the example of FIG. 1 as having three vanes 30, compressor 14 may have additional or less vanes 30 and may includes a number of vanes 30 equal to the number of compression stages.

Vanes 30 mechanically couple to a crank shaft 32, which may further be mechanically coupled to a linking assembly 34. Crank shaft 32 may also mechanically couple to support links 36A and 36B ("support links 36") although crank shaft 32 may be supported by additional or less mechanical support links 36 than the two support links shown in the example of FIG. 1. Linking assembly 34 and support links 36 may include couplings that allow crank shaft 32 to rotate axially (and possibly be displaced along a perpendicular axis to the center lengthwise axis) and thereby mechanically move vanes 30 to vary a pitch of vanes 30.

As a measure of input energy (e.g., fuel consumed) and thereby adjust vanes 30 to possibly optimize performance, gas turbine engine 10 also includes a fuel pump and metering unit (FPMU) 38. FPMU 38 includes a fuel pump (e.g., a fluid pump) and a fuel meter. The fuel meter may measure an amount of fuel 39 (or possibly other fluid) retrieved from a fuel reservoir by the fuel pump and provided to combustor 18.

The fuel pump may output a high pressure fuel via a high pressure fuel line 40A in excess of the amount of fuel required for combustion by combustor 18. This excess fuel is returned as a low pressure fuel (relative to pressure of the high pressure fuel) via a low pressure fuel line 40B. Some of the high pressure fuel is used for activation of the compressor variable geometry, where the actuation process also returns flow back to the low pressure side of the fuel pump (via low pressure fuel line 40B). The actuator servo assembly uses the pressure differential across the fuel pump to generate flow and motive force to move actuator 54.

An electrohydraulic servo assembly may operate with respect to an electric control signal and the fuel. The electrohydraulic servo assembly may include a stepper motor configured to rotate based on the electric control signal to interface with a mechanical mechanism that translates the rotational movement of the stepper motor into a linear movement that operates the servo valve outputting various different pressurized fuels. The actuators may receive, via the electrohydraulic servo assembly, the fuel as a way by which to adjust linear movement of the actuator that then adjusts the position of the variable geometry via crank shaft 32 and the linking assembly 34. As such, the servo assembly may include an electrohydraulic servo assembly that receives a fluid as a high pressure fluid and a low pressure fluid.

In addition, the rotational to linear translation mechanism may be coupled to a lever that attaches to a variable geometry feedback link that indicates mechanical movement of the variable geometry, where this variable geometry feedback link is mechanically coupled to crank shaft 32. The position of actuator 54 may, as an example, be scheduled using an engine shaft speed and an air temperature within compressor 14. The engine shaft speed and air temperature within compressor 14 may vary with the flow of combustor 18 potentially depending on how engine 10 is being operated (e.g., accelerated, decelerated, altitude, airframe forward speed, day temperature, etc.).

However, the mechanical mechanisms required to translate rotational motion of the stepper motor into linear operation for configuring the servo valve to deliver the fuel to drive the linear motion of the actuator may be mechanically complicated and difficult to maintain. For example, the mechanical mechanism may include a linear ball screw that moves one end of the lever which displaces a servo spool of the servo valve. The servo spool then generates a pressure differential and flow to move the actuator, which then feeds back a position of crank shaft 42 via the feedback link to the other end of the lever.

This mechanical mechanism may increase component count that increase build costs as well as introduce a detrimental impact on mass (which may be of significant concern for airplanes) and reliability (as more components may increase points of failure). Furthermore, the number of links between the rotating components (e.g., stepper motor and ball screw) and articulating components (e.g., levers, feedback link, etc.) may create opportunities for wear and ingress of contamination. Wear of components may lead to non-linearity (e.g., backlash), which may affect accuracy of position control of the actuator. Contamination of the articulating components may impact friction in the mechanical mechanism, which may lead to detrimental impacts to accuracy of position control while potentially providing a wearout mechanism that affects the life and possibly the cost of ownership of gas turbine engine 10.

In accordance with various aspects of the techniques described in this disclosure, compressor 14 of gas turbine engine 10 includes a rotary actuator assembly (RAS) 50. RAS 50 may operate rotationally in order to potentially avoid complicated mechanical mechanisms required to translate rotational motion of servo assembly (SA) 52 into linear operation for configuring the servo valve to deliver the fuel to drive the linear motion of an actuator (ACT) 54. SA 52 may include the rotary stepper motor and a rotary servo valve in which a cylindrical outer spool annularly disposed within a cylindrical outer sleeve is mechanically coupled to the rotary stepper motor. Responsive to receiving a control signal, the rotary stepper motor may rotate the cylindrical outer spool to deliver the fuel to the actuator and thereby actuate the actuator to deliver linear force to linking assembly 34 to control vanes 30.

In operation, RAS 50 of gas turbine engine 10 includes SA 52 and actuator 54. SA 52 represents an electrohydraulic servo assembly that includes a rotary servo valve coupled to a stepper motor. The stepper motor may represent a rotary stepper motor that turns at fixed steps (e.g., angular degrees) to operate the rotary servo value, which may include a cylindrical outer sleeve, a cylindrical outer spool, and a cylindrical inner spool. The cylindrical outer spool is annularly disposed within the cylindrical outer sleeve, which includes multiple ports. The ports interconnect with high pressure fuel line 40A and low pressure fuel line 40B. The ports also interconnect with actuator control lines 60A and 60B.

The cylindrical outer spool may include multiple channels configured to provide fluidic interconnection between the multiple ports and the cylindrical inner spool. The cylindrical inner spool is annularly disposed within the cylindrical outer spool and includes grooves configured to provide fluidic interconnection through the multiple channels of the cylindrical outer sleeve.

The stepper motor may mechanically connect to the cylindrical outer spool and rotate the cylindrical outer spool one or more of the fixed steps. The stepper motor may rotate the cylindrical outer spool to align the multiple channels with the ports of the cylindrical outer sleeve and the grooves of the cylindrical inner sleeve to varying degrees of overlap, thereby delivering high pressure fuel from high pressure fuel line 40A or low pressure fuel from low pressure fuel line 40B. SA 52 may output this fuel at varying pressures via actuator control lines 60A and 60B ("actuator control lines 60") to actuate actuator 54, which may act as a piston controlled by pressure differentials between actuator control lines 60 to translate the hydraulic pressure differences into linear force applied to linking assembly 34 to crank shaft 32 and thereby control vanes 30.

As further shown in the example of FIG. 1, actuator 54 is coupled to casing 28 of gas turbine engine 10 via a rotary mount 64 such that actuator 54 rotates around rotary mount 64 when actuated. Actuator 54 may couple, at rotary mount, to a mechanical coupling 62, which itself is coupled to the cylindrical inner spool of the servo valve of SA 52. Mechanical coupling 62 may provide rotary feedback that rotates the cylindrical inner spool of the rotary servo valve that may effectively disable delivery of the fuel to actuator 54 (and thereby stop actuation of actuator 54). In other words, the linear operation of actuator 54 when moving vanes 30 may result in rotation that provides feedback to the stepper motor via mechanical coupling 62 (e.g., a link coupled between actuator 54 and the rotary servo valve and/or stepper motor of SA 52). The stepper motor may also include a magnetic detent to arrest (or in other words, lock) the stepper motor in the event of electrical failure.

In this way, RAS 50 may avoid the complicated mechanical mechanisms to translate rotational motion of the stepper motor in SA 52 into linear operation for configuring the servo valve of SA 52 to deliver the fuel to drive the linear motion of actuator 54. Mechanical coupling 62, being directly coupled to actuator 54 (meaning there may be little to no intervening mechanical mechanisms to translate between rotational to linear movement). In addition, the benefit of potentially only utilizing rotational motion is that servo assembly 52 may be positioned relatively close to actuator 54 (and no linear compressor variable geometry feedback link is required.

Removal of the servo translational mechanism and accompanying feedback link may result in more efficient maintenance. For example, the translational mechanism (between rotational and linear movement) may be prone to wear due to the varying stresses applied during operation of gas turbine engine 10 and the nature of competing forces from the rotary stepper motor and the competing feedback from the feedback link. Given the hydraulic nature of RAS 50, this translational mechanism may reside within the fluid and thereby require disassembly of a fluid tight case. Removal of the translational mechanism may thereby allow for more straightforward maintenance, as the wear on the mechanical coupling of RAS 50 may occur outside of the hydraulic system used to activate actuator 54 while also reducing part counts that are subject to wear.

Figure 2:
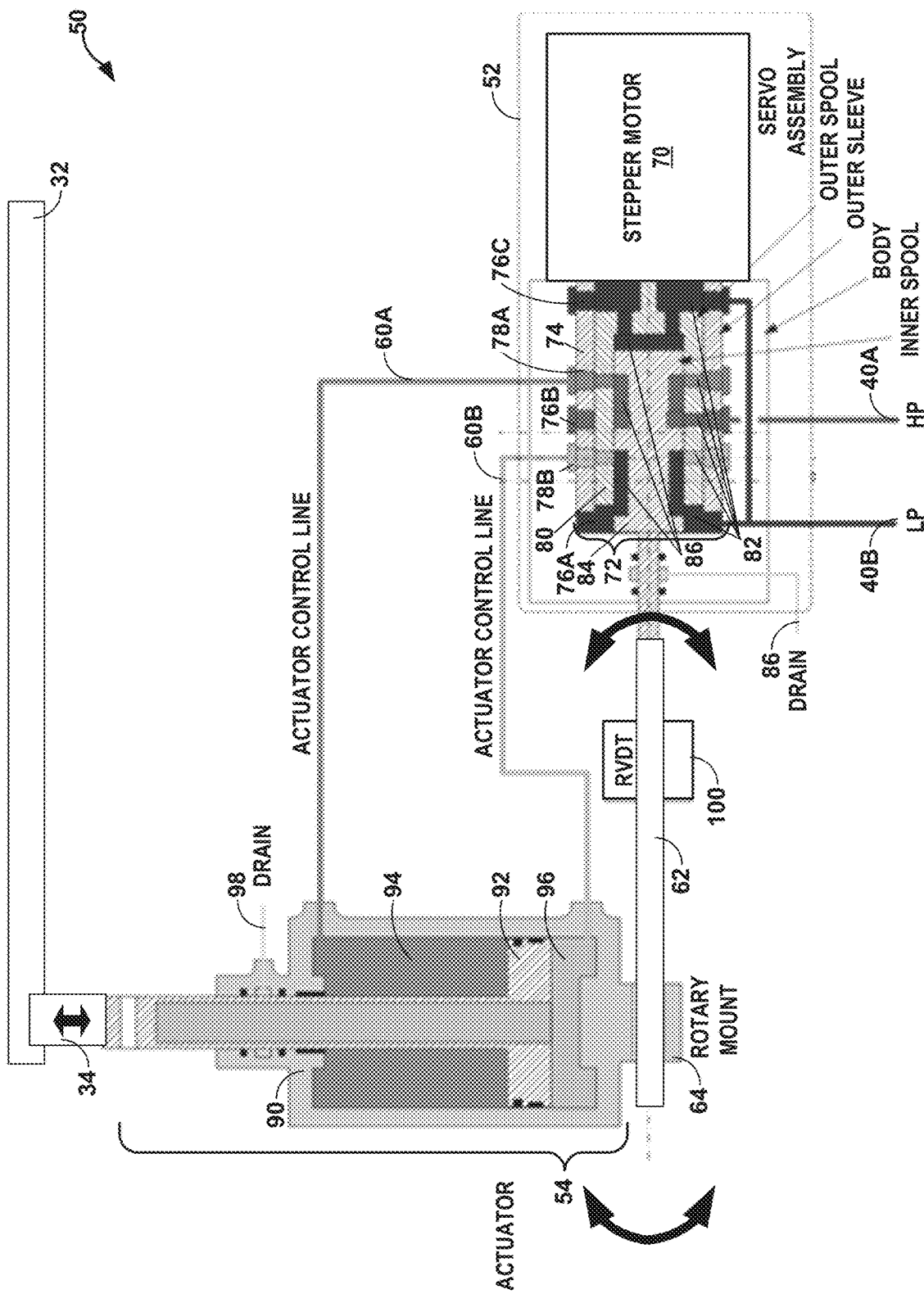
FIG. 2 is a conceptual diagram illustrating the rotatory actuator assembly of FIG. 1 in more detail.

FIG. 2 is a conceptual diagram illustrating the rotary actuator assembly of FIG. 1 in more detail. As shown in the example of FIG. 2, rotary actuator assembly (RAS) 50 includes servo assembly (SA) 52 and actuator 54, which is mounted on rotary mount 64 to casing 28 of gas turbine engine 10 and mechanically coupled to SA 52 via mechanical coupling 62 (which may represent a mechanical link, such as a bar).

As further shown in the example of FIG. 2, SA 52 includes stepper motor 70 and servo valve 72. Stepper motor 70 may represent a rotary stepper motor that is configured to rotate in fixed steps of a configurable number of angular degrees. As noted above, stepper motor 70 may include a magnetic detent that may arrest (or, in other words, lock) stepper motor 70 responsive to an electrical failure. Stepper motor 70 may receive a control signal indicative of a direction of rotation and a number of steps.

Servo valve 72 may represent a rotary servo valve (and hence may be referred to as rotary servo valve 72) that is configured to connect high pressure (HP) fuel from HP line 40A or low pressure (LP) fuel from LP line 40B to actuator 54. Rotary servo valve 72 may include a cylindrical outer sleeve 74 that includes ports 76A-76C (and corresponding ports 76D-76F, which are not explicitly shown for ease of illustration purposes and reside opposite to ports 76A-76C by approximately 180 degrees around cylindrical outer sleeve 74) that couple rotary servo valve 72 to HP line 40A (via ports 76B and 76E) and LP line 40B (via ports 76A, 76C, 76D, and 76F).

Cylindrical outer sleeve 74 also includes ports 78A and 78B (and corresponding ports 78C and 78D, which again are not explicitly shown for ease of illustration purposes and reside opposite to ports 78A and 78B by approximately 180 degrees around cylindrical outer sleeve 74). Ports 78A (and 78C) couple rotary servo valve 72 to actuator control lines 60A, while ports 78B (and 78D) couple rotary servo valve 72 to actuator control lines 60B.

Rotary servo valve 72 also includes a cylindrical outer spool 80 annularly disposed within concentric outer sleeve 74. Cylindrical outer spool 80 includes multiple channels 82 disposed adjacent to and directly below ports 76A-76F ("ports 76") and/or ports 78A-78D ("ports 78") to provide a fluidic interconnection with cylindrical outer sleeve 74 and a cylindrical inner spool 84. Channels 82 may be regularly or irregularly disposed around cylindrical outer spool 80 and may not necessarily include corresponding channels 82 that are disposed around cylindrical outer spool 80 opposite to ports 78 denoted in the example of FIG. 2 at approximately 180 degrees).

Rotary servo valve 72 may also include cylindrical inner spool 84 that includes multiple grooves 86 that are disposed around cylindrical inner spool 84 at 90 degree intervals. Grooves 86 may be offset at 90 degree intervals around cylindrical inner spool 84 to balance delivery of either HP fuel or LP fuel to actuator 54, as discussed in more detail below with respect to the example of FIGS. 3A-3C. Grooves 86 may be disposed below channels 82 to provide a fluidic interconnection between cylindrical inner spool 84 and cylindrical outer spool 80.

Rotary servo valve 72 may also include a drain 86. Drain 86 may be arranged within a double seal along a rotary drive shaft of the cylindrical inner spool 84 to allow rotation of actuator 54 to be transmitted to cylindrical inner spool 84. The double seal arrangement with intermediate drain 86 provides overboard leakage to contain fuel, which may pose a fire risk. Failure of the inner seal (meaning closer to rotary servo valve 72 compared to the outer seal which is closer to the linking mechanism 62) may feed to a controlled drain point (not shown in the example of FIG. 1) on gas turbine engine 10 rather than a leak overboard to the engine bay.

As also shown in the example of FIG. 2, actuator 54 includes a housing 90, a piston 92 disposed within housing 90, an upper chamber 94, a lower chamber 96, and a drain 98. Housing 90 may represent a hydraulically sealed housing in which a piston 92 is disposed that separates housing 90 into upper chamber 94 and lower chamber 96. Housing 90 may include a single chamber, in other words, that piston 92 moves within in response to a fluid being injected via either of actuator control line 60A (into upper chamber 94) or actuator control line 60B (into lower chamber 96). Drain 98 may be intermediately positioned between two seals that allows any of the fuel that escapes the housing 90 (due to movement of piston 92) to flow to drain 98, and thereby potentially prevent fuel from entering the engine bay, which again may result in a fire hazard.

As discussed above, stepper motor 70 may receive a control signal (not shown in the example of FIG. 2 for ease of illustration purposes). Responsive to receiving the control signal, stepper motor 70 may rotate cylindrical outer spool 80 to fluidly interconnect cylindrical inner spool 84 to ports 78 of cylindrical outer sleeve 74, and thereby provide fuel via actuator control lines 60 to actuator 54. Depending on whether the fuel is LP fuel or HP fuel, piston 92 of actuator 55 may move linearly up or down to move linking assembly 34 in order to adjust crank shaft 32 that moves vanes 30.

Responsive to activation of piston 92 of actuator 54, actuator 54 may rotate about rotary mount 64 that further rotates linking mechanism 62 that is mechanically coupled to the drive shaft of cylindrical inner spool 84, providing a form of feedback by which to measure movement of actuator 54 (and mechanically linked crank shaft 32). Rotation of linking mechanism 62 may turn cylindrical inner spool 84 so as to adjust delivery of HP fuel or LP fuel to actuator control lines 60 via channels 82 of cylindrical outer spool 80 (and ports 78 of cylindrical outer sleeve 74).

RAS 50 may further include a rotary variable differential transformer (RVDT) 100 configured to produce an electrical signal representative of rotational movement of linking mechanism 62 between actuator 54 and cylindrical inner spool 84. RVDT 100 may provide feedback to a controller (that outputs the control signal to control stepper motor 70, where such controller is not shown in the example of FIG. 2 for ease of illustration purposes). Although shown as being located on the rotary axis of stepper motor 70 and actuator 54, RVDT 100 may be part of actuator 54, SA 52, or elsewhere in the actuated mechanism.

Figure 3A:
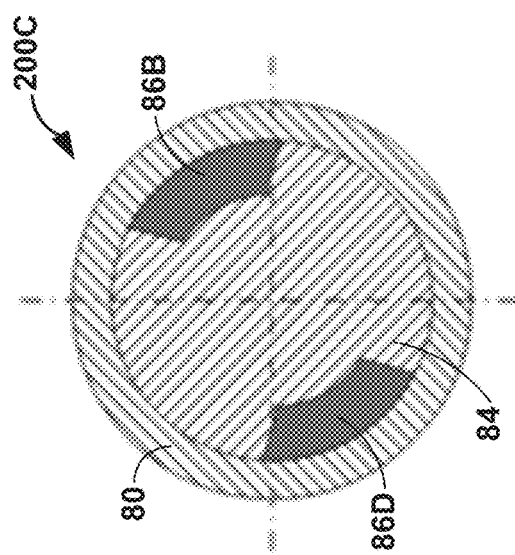
FIGS. 3A-3C are diagrams illustrating cross-sectional views of the cylindrical outer spool and the cylindrical inner spool at different positions along an axis of the servo valve shown in the example of FIG. 2.
Figure 3B:
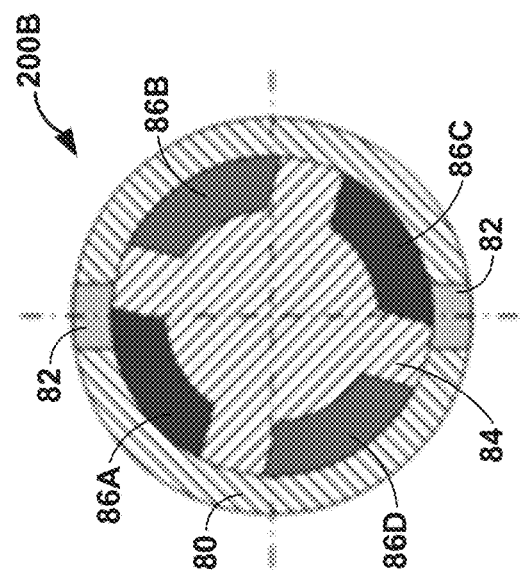
Figure 3C:
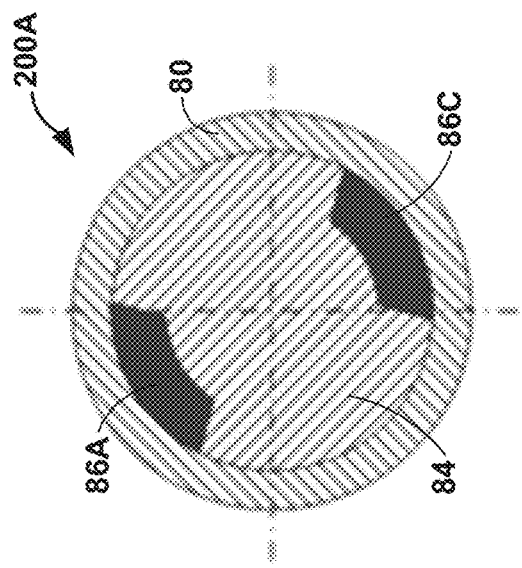

FIGS. 3A-3C are diagrams illustrating cross-sectional views of the cylindrical outer spool and the cylindrical inner spool at different positions along an axis of the servo valve shown in the example of FIG. 2. In the example of FIG. 3A, cross-sectional view 200A shows cylindrical outer spool 80 and cylindrical inner spool 84 at an axial location close to the drive shaft and linking mechanism 62. Cylindrical inner spool 84 includes two grooves 86A and 86C that are used to deliver LP fuel via LP line 40B. Groves 86A and 86C are offset radially by 180 degrees about the circumference of cylindrical inner spool 84.

In the example of FIG. 3B, cross-sectional view 200B shows cylindrical outer spool 80 and cylindrical inner spool 84 at an axial location in the middle of servo valve 72. Cylindrical outer spool 80 includes two channels 82 that fluidically couple to ports 78 and thereby allows grooves 86 to fluidically interconnect through channels 82 to ports 78, thereby providing (in this example) LP fuel from LP line 40B to ports 78. Cylindrical inner spool 84 includes four grooves 86 that are offset 90 degrees radially about the outer surface of cylindrical inner spool 84. Grooves 86A and 86C provide LP fuel while grooves 86B and 86D provide HP fuel.

In the example of FIG. 3C, cross-sectional view 200C shows cylindrical outer spool 80 and cylindrical inner spool 84 at an axial location close to stepper motor 70. Cylindrical inner spool 84 includes two grooves 86B and 86D that are used to deliver HP fuel via HP line 40A. Grooves 86B and 86D are offset radially by 180 degrees about the circumference of cylindrical inner spool 84.

Rotation of cylindrical inner spool 84 (by way of linking mechanism 62) relative to cylindrical outer spool 80 may change the communication between supply pressure (HP fuel) and return pressure (LP fuel) with actuator servo pressure. The second actuator servo line/port is similarly configured but clocked at 90° to the other servo porting such that when one actuator control line 60 is in communication with supply pressure the other actuator control line 60 is in communication with return pressure and vice versa.

To balance hydraulic forces from rotary spool ports 78, axial grooves 86 are distributed symmetrically around the periphery of cylindrical outer and inner spools 80/84. This symmetrical distribution may minimize asymmetric loading that can create friction between moving parts that would otherwise require more electrical power (from stepper motor 70) to overcome. The differential pressure between the ends of each spool 80/84 may also be minimized to reduce axial loading and remove the necessity for a significant thrust bearing.

An example sequence of operation to move actuator 54 would be the following. First, power stepper motor 70 (via a control signal) to rotate stepper motor 70 to a new position. Cylindrical inner spool 84 rotates (in response to the new position of stepper motor 70 and movement of actuator 54) allowing communication between one actuator control pressure line 60 and HP line 40A and between the other actuator control pressure line 60 and LP line 40B. Once friction in the actuated mechanism (e.g., crank shaft 32) is overcome the linear actuator slews, changing the position of components in the engine actuated mechanism (e.g., vanes 30) and also causing actuator 54 to rotate about rotary mount 64. Rotation of actuator 54 about rotary mount 64 rotates in turn linking mechanism 62, thereby rotating cylindrical inner spool 84 to reduce the communication between actuator control lines 60 and HP/LP lines 40. Actuator 54 continues to slew until cylindrical inner spool 84 has moved far enough to close off (e.g., decouple) fluidic interconnection between HP line 40A and actuator control lines 60, at which point movement of actuator 54 ceases.

As another example, the operation of servo assembly 52 may include instances where power to stepper motor 70 has been lost. The ability of the controller to maintain position of actuator 54 in this scenario of lost power may be beneficial. Operation, in this example, would be as described above except that no input from stepper motor 70 is given, as stepper motor 70 lacks power. Movement of actuator 54 through loading or vibration will feed back via the above described mechanisms and produce a corrective force to push actuator 54 back into position. This functionality is in comparison to normal servo systems that are designed to drift to one end of their stroke when electrical power is lost, rather than stay fixed.

Figure 4:
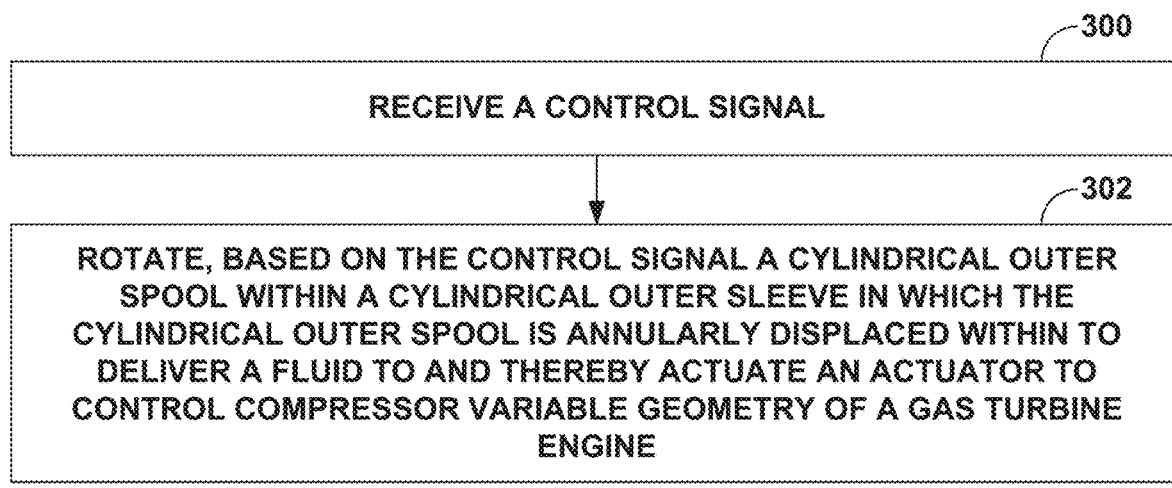
FIG. 4 is a flowchart illustrating example operation of the rotary actuator assembly of FIG. 2 for control of compressor variable geometry in accordance with various aspects of the techniques described in this disclosure.

FIG. 4 is a flowchart illustrating example operation of the rotary actuator assembly of FIG. 2 for control of compressor variable geometry in accordance with various aspects of the techniques described in this disclosure. Stepper motor 70 may initially receive a control signal (300). Stepper motor 70 may rotate, based on the control signal, cylindrical outer spool 80 within cylindrical outer sleeve 74 in which cylindrical outer spool 80 is annularly displaced within to deliver a fluid to and thereby actuate actuator 54 to control compressor variable geometry 30 (shown in the example of FIG. 1) of gas turbine engine 10 (302).

As noted above, there may be various corrective mechanisms (e.g., RVDT 100) that avoid error due to various conditions (such as slippage in stepper motor 70). RVDT 1000 may output a signal that allows the controller to identify an error in position, which thereby enables controller to perform corrective steps with respect to the position of actuator 54.

In this way, various aspects of the techniques may enable the following clauses.

Clause 1. A rotary actuation system of a gas turbine engine comprising: a servo assembly that includes: a cylindrical outer sleeve including multiple ports; a cylindrical outer spool annularly disposed within the cylindrical outer sleeve, wherein: the cylindrical outer spool includes multiple channels configured to provide fluidic interconnection between the multiple ports and a cylindrical inner spool, the cylindrical inner spool is annularly disposed within the cylindrical outer spool, and the cylindrical inner spool includes grooves configured to provide fluidic interconnection through the multiple channels of the cylindrical outer sleeve; and a stepper motor mechanically coupled to the cylindrical outer spool; and an actuator mechanically coupled to compressor variable geometry that controls compression provided by a compressor of the gas turbine engine, wherein the stepper motor is configured to rotate the cylindrical outer spool within the cylindrical outer sleeve to deliver a fluid to and thereby actuate the actuator to control the compressor variable geometry.

Clause 2. The rotary actuation system of clause 1, wherein the actuator is coupled to a body of the gas turbine engine via a rotary mount such that the actuator rotates when actuated about a mechanical coupling to the stepper motor.

Clause 3. The rotary actuation system of clause 2, wherein the mechanical coupling between the actuator and the stepper motor rotates the cylindrical inner spool to decouple fluidic interconnection between the grooves and the multiple channels to prevent further actuation of the actuator.

Clause 4. The rotary actuation system of any combination of clauses 2 and 3, further comprising a rotary variable differential transformer configured to produce an electrical signal representative of rotational movement of the mechanical coupling between the actuator and the cylindrical inner spool.

Clause 5. The rotary actuation system of any combination of clauses 1-4, wherein the stepper motor includes a magnetic detent that locks the stepper motor in event of electrical failure to the stepper motor.

Clause 6. The rotary actuation system of any combination of clauses 1-5, wherein the actuator comprises a linear actuator that is mechanically coupled to a crank shaft of the compressor variable geometry.

Clause 7. The rotary actuation system of any combination of clauses 1-6, wherein the compressor variable geometry includes compressor vanes that are mechanically disposed to change pitch in response to actuation of the actuator by the stepper motor.

Clause 8. The rotary actuation system of any combination of clauses 1-7, wherein the fluid comprises fuel used by the gas turbine engine for combustion.

Clause 9. The rotary actuation system of any combination of clauses 1-8, wherein the servo assembly comprises an electrohydraulic servo assembly that receives the fluid as a high pressure fluid and a low pressure fluid, wherein the grooves of the cylindrical inner spool are disposed around the cylindrical inner spool at 90 degree intervals, wherein the actuator comprises a hydraulic actuator that drives a piston via varying fluid pressures, and wherein the stepper motor is configured to rotate the cylindrical outer spool to deliver either the high pressure fluid or the low pressure fluid via the channels to the ports in order to actuate the hydraulic actuator to drive the piston mechanically coupled to the compressor variable geometry.

Clause 10. The rotary actuation system of clause 9, wherein the servo assembly is fluidically coupled to a fluid pump that delivers the high pressure fluid and the low pressure fluid to the servo assembly.

Clause 11. A method comprising: receiving a control signal; and rotating, by a stepper motor of a servo assembly and based on the control signal, a cylindrical outer spool within a cylindrical outer sleeve in which the cylindrical outer spool is annularly displaced within to deliver a fluid to and thereby actuate an actuator to control compressor variable geometry of a gas turbine engine, wherein the cylindrical outer sleeve includes multiple ports, wherein the stepper motor is mechanically coupled to the cylindrical outer spool, wherein the cylindrical outer spool includes multiple channels configured to provide fluidic interconnection between the multiple ports and a cylindrical inner spool, wherein the cylindrical inner spool is annularly displaced within the cylindrical outer spool, the cylindrical inner spool including grooves configured to provide fluidic interconnection through the multiple channels of the cylindrical outer sleeve, and wherein the actuator is mechanically coupled to the compressor variable geometry.

Clause 12. A gas turbine engine comprising: a combustor; a compressor fluidically upstream of the combustor that includes compressor variable geometry configured to control compression by the compressor; and a rotary actuation system mounted to a body of the gas turbine engine, the rotary actuation system including: a servo assembly that includes: a cylindrical outer sleeve including multiple ports; a stepper motor mechanically coupled to a cylindrical outer spool annularly displaced within the cylindrical outer sleeve; the cylindrical outer spool including multiple channels configured to provide fluidic interconnection between the multiple ports and a cylindrical inner spool; and the cylindrical inner spool annularly displaced within the cylindrical outer spool, the cylindrical inner spool including grooves configured to provide fluidic interconnection through the multiple channels of the cylindrical outer sleeve; and an actuator mechanically coupled to the compressor variable geometry, wherein the stepper motor is configured to rotate the cylindrical outer spool within the cylindrical sleeve to deliver a fluid to and thereby actuate the actuator to control the compressor variable geometry.

Clause 13. The gas turbine engine of clause 12, wherein the actuator is coupled to a body of the gas turbine engine via a rotary mount such that the actuator rotates when actuated about a mechanical coupling to the stepper motor.

Clause 14. The gas turbine engine of clause 13, wherein the mechanical coupling between the actuator and the stepper motor rotates the cylindrical inner spool to decouple fluidic interconnection between the grooves and the multiple channels to prevent further actuation of the actuator.

Clause 15. The gas turbine engine of any combination of clauses 13 and 14, further comprising a rotary variable differential transformer configured to produce an electrical signal representative of rotational movement of the mechanical coupling between the actuator and the cylindrical inner spool.

Clause 16. The gas turbine engine of any combination of clauses 12-15, wherein the stepper motor includes a magnetic detent that locks the stepper motor in event of electrical failure to the stepper motor.

Clause 17. The gas turbine engine of any combination of clauses 12-16, wherein the actuator comprises a linear actuator that is mechanically coupled to a crank shaft of the compressor variable geometry.

Clause 18. The gas turbine engine of any combination of clauses 12-17, wherein the compressor variable geometry includes compressor vanes that are mechanically disposed to change pitch in response to actuation of the actuator by the stepper motor.

Clause 19. The gas turbine engine of any combination of clauses 12-18, wherein the fluid comprises fuel used by the gas turbine engine for combustion.

Clause 20. The gas turbine engine of any combination of clauses 12-19, wherein the servo assembly comprises an electrohydraulic servo assembly that receives the fluid as a high pressure fluid and a low pressure fluid, wherein the grooves of the cylindrical inner spool are disposed around the cylindrical inner spool at 90 degree intervals, wherein the actuator comprises a hydraulic actuator that drives a piston via varying fluid pressures, and wherein the stepper motor is configured to rotate the cylindrical outer spool to deliver either the high pressure fluid or the low pressure fluid via the channels to the ports in order to actuate the hydraulic actuator to drive the piston mechanically coupled to the compressor variable geometry.

Various examples have been described. These and other examples are within the scope of the following claims.

What is claimed is:

1. A rotary actuation system of a gas turbine engine comprising:
   a servo assembly that includes:
      a cylindrical outer sleeve including multiple ports;
      a cylindrical outer spool annularly disposed within the cylindrical outer sleeve, wherein:
         the cylindrical outer spool includes multiple channels configured to provide fluidic interconnection between the multiple ports and a cylindrical inner spool,
         the cylindrical inner spool is annularly disposed within the cylindrical outer spool, and
         the cylindrical inner spool includes grooves configured to provide fluidic interconnection through the multiple channels of the cylindrical outer sleeve; and
      a stepper motor mechanically coupled to the cylindrical outer spool; and
   an actuator mechanically coupled to compressor variable geometry that controls compression provided by a compressor of the gas turbine engine,
   wherein the stepper motor is configured to rotate the cylindrical outer spool within the cylindrical outer sleeve to deliver a fluid to and thereby actuate the actuator to control the compressor variable geometry.

2. The rotary actuation system of claim 1, wherein the actuator is coupled to a body of the gas turbine engine via a rotary mount such that the actuator rotates when actuated about a mechanical coupling to the stepper motor.

3. The rotary actuation system of claim 2, wherein the mechanical coupling between the actuator and the stepper motor rotates the cylindrical inner spool to decouple fluidic interconnection between the grooves and the multiple channels to prevent further actuation of the actuator.

4. The rotary actuation system of claim 2, further comprising a rotary variable differential transformer configured to produce an electrical signal representative of rotational movement of the mechanical coupling between the actuator and the cylindrical inner spool.

5. The rotary actuation system of claim 1, wherein the stepper motor includes a magnetic detent that locks the stepper motor in event of electrical failure to the stepper motor.

6. The rotary actuation system of claim 1, wherein the actuator comprises a linear actuator that is mechanically coupled to a crank shaft of the compressor variable geometry.

7. The rotary actuation system of claim 1, wherein the compressor variable geometry includes compressor vanes that are mechanically disposed to change pitch in response to actuation of the actuator by the stepper motor.

8. The rotary actuation system of claim 1, wherein the fluid comprises fuel used by the gas turbine engine for combustion.

9. The rotary actuation system of claim 1,
   wherein the servo assembly comprises an electrohydraulic servo assembly that receives the fluid as a high pressure fluid and a low pressure fluid,
   wherein the grooves of the cylindrical inner spool are disposed around the cylindrical inner spool at 90 degree intervals,
   wherein the actuator comprises a hydraulic actuator that drives a piston via varying fluid pressures, and
   wherein the stepper motor is configured to rotate the cylindrical outer spool to deliver either the high pressure fluid or the low pressure fluid via the channels to the ports in order to actuate the hydraulic actuator to drive the piston mechanically coupled to the compressor variable geometry.

10. The rotary actuation system of claim 9, wherein the servo assembly is fluidically coupled to a fluid pump that delivers the high pressure fluid and the low pressure fluid to the servo assembly.

11. A method comprising:
   receiving a control signal; and
   rotating, by a stepper motor of a servo assembly and based on the control signal, a cylindrical outer spool within a cylindrical outer sleeve in which the cylindrical outer spool is annularly displaced within to deliver a fluid to and thereby actuate an actuator to control compressor variable geometry of a gas turbine engine,
   wherein the cylindrical outer sleeve includes multiple ports,
   wherein the stepper motor is mechanically coupled to the cylindrical outer spool, wherein the cylindrical outer spool includes multiple channels configured to provide fluidic interconnection between the multiple ports and a cylindrical inner spool, wherein the cylindrical inner spool is annularly displaced within the cylindrical outer spool, the cylindrical inner spool including grooves configured to provide fluidic interconnection through the multiple channels of the cylindrical outer sleeve, and wherein the actuator is mechanically coupled to the compressor variable geometry.

12. A gas turbine engine comprising:

a combustor;

a compressor fluidically upstream of the combustor that includes compressor variable geometry configured to control compression by the compressor; and a rotary actuation system mounted to a body of the gas turbine engine, the rotary actuation system including:

a servo assembly that includes:

a cylindrical outer sleeve including multiple ports;

a stepper motor mechanically coupled to a cylindrical outer spool annularly displaced within the cylindrical outer sleeve;

the cylindrical outer spool including multiple channels configured to provide fluidic interconnection between the multiple ports and a cylindrical inner spool; and the cylindrical inner spool annularly displaced within the cylindrical outer spool, the cylindrical inner spool including grooves configured to provide fluidic interconnection through the multiple channels of the cylindrical outer sleeve; and an actuator mechanically coupled to the compressor variable geometry, wherein the stepper motor is configured to rotate the cylindrical outer spool within the cylindrical sleeve to deliver a fluid to and thereby actuate the actuator to control the compressor variable geometry.

13. The gas turbine engine of claim 12, wherein the actuator is coupled to a body of the gas turbine engine via a rotary mount such that the actuator rotates when actuated about a mechanical coupling to the stepper motor.

14. The gas turbine engine of claim 13, wherein the mechanical coupling between the actuator and the stepper motor rotates the cylindrical inner spool to decouple fluidic interconnection between the grooves and the multiple channels to prevent further actuation of the actuator.

15. The gas turbine engine of claim 13, further comprising a rotary variable differential transformer configured to produce an electrical signal representative of rotational movement of the mechanical coupling between the actuator and the cylindrical inner spool.

16. The gas turbine engine of claim 12, wherein the stepper motor includes a magnetic detent that locks the stepper motor in event of electrical failure to the stepper motor.

17. The gas turbine engine of claim 12, wherein the actuator comprises a linear actuator that is mechanically coupled to a crank shaft of the compressor variable geometry.

18. The gas turbine engine of claim 12, wherein the compressor variable geometry includes compressor vanes that are mechanically disposed to change pitch in response to actuation of the actuator by the stepper motor.

19. The gas turbine engine of claim 12, wherein the fluid comprises fuel used by the gas turbine engine for combustion.

20. The gas turbine engine of claim 12, wherein the servo assembly comprises an electrohydraulic servo assembly that receives the fluid as a high pressure fluid and a low pressure fluid, wherein the grooves of the cylindrical inner spool are disposed around the cylindrical inner spool at 90 degree intervals, wherein the actuator comprises a hydraulic actuator that drives a piston via varying fluid pressures, and wherein the stepper motor is configured to rotate the cylindrical outer spool to deliver either the high pressure fluid or the low pressure fluid via the channels to the ports in order to actuate the hydraulic actuator to drive the piston mechanically coupled to the compressor variable geometry.

* * * * *